United States Patent [19]

Lovely

[11] 4,228,456

[45] Oct. 14, 1980

[54] BURST GATING SIGNAL GENERATING CIRCUIT

[75] Inventor: John D. Lovely, Batavia, N.Y.

[73] Assignee: GTE Products Corporation, Stamford, Conn.

[21] Appl. No.: 50,372

[22] Filed: Jun. 20, 1979

Related U.S. Application Data

[63] Continuation-in-part of Ser. No. 33,582, Apr. 26, 1979, abandoned.

[51] Int. Cl.³ ............................................... H04N 9/46
[52] U.S. Cl. ...................................................... 358/20
[58] Field of Search ..................... 358/19, 20; 328/139

[56] References Cited

U.S. PATENT DOCUMENTS

| | | | |
|---|---|---|---|
| 3,544,708 | 12/1970 | Buechel | 358/20 |
| 4,149,180 | 4/1979 | Lovely | 358/20 |

*Primary Examiner*—John C. Martin
*Attorney, Agent, or Firm*—John A. Odozynski

[57] ABSTRACT

A circuit for generating an accurately-timed noise-free signal for gating the chrominance burst portion of the composite video signal. The horizontal sync pulses are differentiated and clamped to the horizontal blanking pulses. The output pulses are then applied to a gating diode that is conductive only when those pulses have an amplitude above a predetermined bias level. The resultant pulses are coupled to the input of a burst gate so that the gate is open only for a period of time substantially coterminous with the burst period.

The burst gate is thereby rendered immune to noise signals occurring during the active line period and the accuracy of the gating signal is independent of the television receiver's horizontal time base.

16 Claims, 3 Drawing Figures

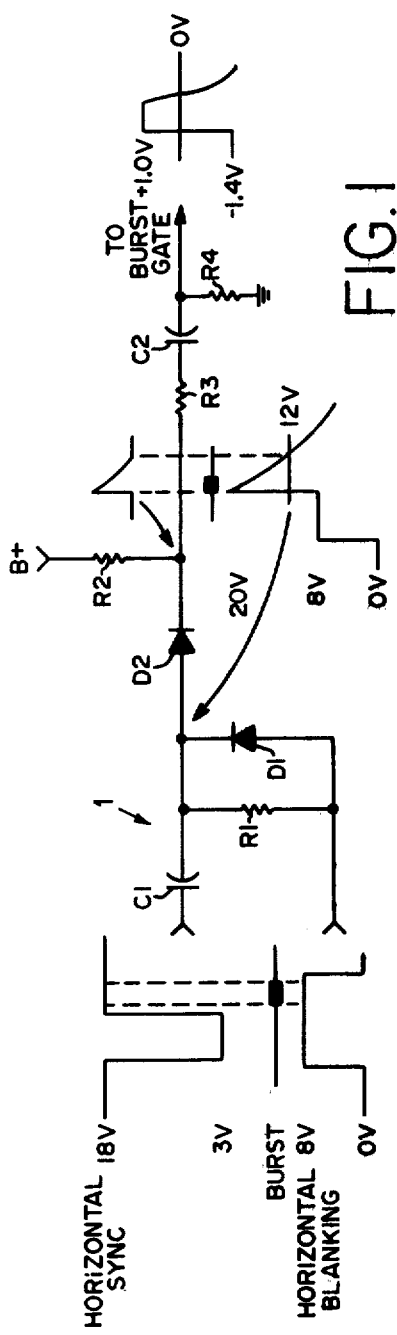
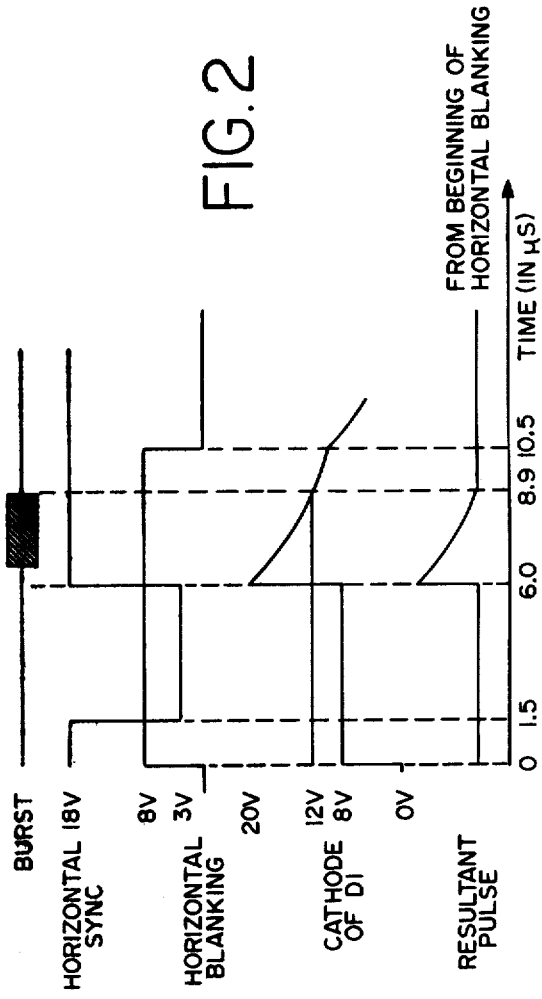

BURST GATING SIGNAL GENERATING CIRCUIT

CROSS-REFERENCE TO RELATED APPLICATION

This application is a continuation-in-part of Ser. No. 33,582, filed Apr. 26, 1979, and assigned to the Assignee of the present invention.

TECHNICAL FIELD

This invention relates to chrominance processing circuitry in general and more particularly to simplified circuitry for generating a burst gating signal so as to more accurately extract the chrominance burst signal from the composite video waveform.

BACKGROUND ART

Color television receivers use the 3.58 MHz chrominance burst signal, generated at the transmitter, to synchronize and otherwise condition the receiver's locally-generated chrominance reference oscillator. Because only approximately eight cycles of the burst signal are provided on the "back-porch" after the horizontal synchronizing pulse, it is desirable to "gate" the burst signal so that only it, and not spurious signals or noise components, are allowed to reach the chrominance processing stages.

Historically this has been done by using the horizontal flyback pulse as the burst gating signal, relying on its coincidence with the burst period. Such systems have proved less than ideal because, inter alia, the horizontal flyback pulse typically has a width of approximately 13 microseconds, whereas the period of the burst signal is in the neighborhood of 2.3 microseconds. Furthermore, because of errors in the free-running frequency of the receiver's horizontal oscillator, there may be as much as a ±4 microseconds difference between the occurrence of the synchronizing pulses and the flyback pulses. As a result, the burst gate pulsewidth is necessarily made wider than the burst duration, to the detriment of the chrominance control characteristics of the receiver. This is especially evident when the first microsecond or so of an active line is allowed to pass through the burst gate. The reference oscillator will then possess an error component related to the signal that has erroneously passed through the burst gate. The color content of the picture will vary with the error component.

Errors can also accrue from tolerances in the components associated with the horizontal phasing circuits which determine the relative phase between the video signal blanking period and the horizontal flyback pulse. In any event, this phasing tends to be undefined because the horizontal phase-locked loop is in effect a lowpass filter.

A more accurate burst gating pulse can be derived from the trailing edge of the horizontal sync pulse. In one form, the horizontal sync pulses can be differentiated and used to open the burst gate. However, because a differentiating circuit necessarily has the characteristics of a high-pass filter, noise pulses received with the composite video signal will also open the burst gate, thereby introducing erroneous information into the chrominance reference channel.

U.S. Pat. No. 4,149,180, "Burst Gating Signal Generating Circuit", dated Apr. 10, 1979, by the same inventor and assigned to the same assignee as the subject invention, and hereby incorporated by reference, discloses a circuit that obviates these drawbacks. That circuit differentiates and clips the horizontal sync pulses, thereby developing a positive-going, exponentially-decaying pulse, substantially coincident with the chrominance burst signal. The resultant pulse is applied to one terminal of a switch. Horizontal flyback pulses are phase-delayed and applied to another terminal of the switch so that the resultant pulse is shorted to ground except during a predetermined portion of the horizontal flyback period. The effect is a burst gating signal having a pulse width effectively equal to and concident with the burst signal period. The accurately-timed burst gating signal so synthesized preserves the receiver's performance by maintaining the noise immunity of the burst gate and by preventing spurious signals from entering the chrominance reference channel. The subject invention accomplishes similarly salutary results through the use of a related, although significantly simplified circuit.

DISCLOSURE OF INVENTION

The invention is a method of and circuit for generating a burst gating signal. A differentiating circuit differentiates the horizontal sync pulses. Negative-going differentiated pulses are clamped to the horizontal blanking pulses; positive-going differentiated pulses are added to the horizontal blanking pulses. Portions of the resultant pulses, i.e., clamped and added blanking and sync pulses, in excess of a predetermined value are gated and coupled to the burst gate circuit.

The burst gating signal so generated assures accurately-timed, noise immune operation of the burst gate.

BRIEF DESCRIPTION OF THE DRAWINGS

FIG. 1 is a schematic diagram of the subject invention, showing significant waveforms developed therein. The shaded rectangular areas represent the chrominance burst period and indicate the relationship between those waveforms and the chrominance burst signal.

FIG. 2 is a timing diagram showing more specifically the temporal relationship of the waveforms depicted in FIG. 1.

BEST MODE FOR CARRYING OUT THE INVENTION

Figure 3:
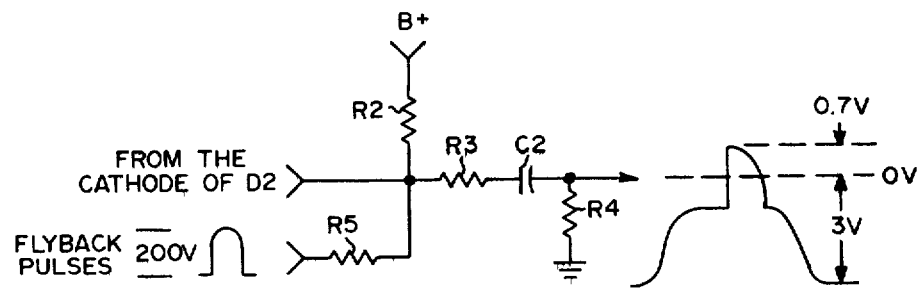
FIG. 3 illustrates a modification of the subject circuit that permits proper operation in conjunction with particular chrominance Automatic Frequency and Phase Control circuits that require a period burst gating signal at all times, even in the absence of a signal at the input of the receiver.

For a better understanding of the present invention, together with other and further objects, advantages and capabilities thereof, reference is made to the following disclosure and appended claims in connection with the above-described drawings.

Referring now to FIG. 1, negative-going horizontal sync pulses are coupled to a first input of a differentiating circuit 1 comprising a series-connected capacitor C1 and a resistor R1. The horizontal sync pulses have an amplitude of approximately 15 volts, varying from a quiescent level of 18 volts during the trace period of each line to approximately 3-volts at the start of the retrace period. The sync pulse duration is approximately 4.5 microseconds. ($\mu$S) Positive-going, substantially rectangular horizontal blanking pulses having an amplitude of 8 volts, that is, going from 0 to 8 volts during the blanking period, are coupled to a second input of the differentiating circuit at one end of R1. The blanking pulses have a duration of approximately 10.5 μS and subsume both the sync pulse period as well as the chrominance burst interval. (FIG. 2 indicates more specifically the timing relationships of the burst sync and blanking signals, as well as waveforms appearing elsewhere in the subject circuit. Note that the burst signal occurs approximately 1.6 μS after the end of the sync signal and that the horizontal blanking signal last approximately 1.6 μS after the end of the burst signal.) A clamping diode D1 has an anode coupled to the blanking pulses and a cathode coupled to the output of the differentiating circuit, at the junction of R1 and C1. A gating diode D2 has an anode coupled to the output of the differentiating circuit and a cathode coupled through a resistor R2 to a 12-volt bias supply, B+. In a manner more fully described below, C1 and R1 differentiate the sync pulses; the differentiated pulses are clamped by D1 and added to the 8-volt blanking pulses. Because of the bias applied to the cathode of D2, the pulses appearing there, hereinafter referred to as "resultant" pulses, will correspond to only those portions of the clamped and added sync and blanking pulses of an amplitude greater than the valve of B+, 12 volts. The resultant pulses are AC coupled through a series-connected resistor and capacitor, R3 and C2, to the input of a burst gate circuit (not shown). The input of the burst gate circuit is tied to ground through a resistor R4.

The circuit described above operates as follows, ignoring hereafter the voltage drops across both D1 and D2 and assumming, except as specified, low impedance sources for both the sync and blanking pulses.

At the inception of the horizontal blanking period, the 8-volt blanking pulse appears at the anode of D1. D1 becomes conductive and couples the blanking pulse to the anode of D2. Because the blanking pulse amplitude is less than B+, D2 will remain reverse biased. As shown in FIG. 2, approximately 1.5 μS after the beginning of the horizontal blanking period the leading (negative-going) edge of the sync pulse will appear at the input of the differentiating circuit and the voltage at that point will be approximately 3 volts. However, the output of the differentiating circuit will be clamped by the forward biased D1 to 8 volts. At the trailing (positive-going) edge of the sync pulse, a 15-volt transition is coupled by C1 to the cathode of D1. D1 will become reversed biased and its clamping effect will be overcome. A 12-volt step appears at that point and is added to the 8-volt blanking pulse. The amplitude of the step is dependent, inter alia, on the output impedance of the horizontal sync source and the values of R1 and C1. Given an ideal voltage source the entire 15 volts transition could conceivably appear at the output of the differentiating circuit. In any event, the combined differentiated sync and blanking pulses at the output of the differentiating circuit will be sufficient to forward bias D2 and the resultant pulse, stripped of the horizontal blanking pedestal, will appear at its cathode. As C1 is charged through R1, that is, as the sync pulse is differentiated, the voltage at the cathode of D2 will exponentially decay with a time constant determined by R1 and C1, and at some time it will fall below 12 volts and D2 will again become reverse biased, signaling the end of the resultant pulse period. The length of the resultant pulse period is largely determined by the R1-C1 time constant. Respective values of 22 kilohm and 330 picofarad provided the waveform shown in FIG. 2. The pulse at the input of the burst gate will be largely an attenuated, AC-coupled version of the resultant pulse. As shown in FIG. 1, it will vary from approximately 1.4 volts to 1.0 volts, at which point the burst gate input circuit will become conductive and have a clipping affect. It can be assumed that the burst gate remains open during the time that the clamping effect persists and that this time is substantially coincident with the burst reference interval.

From the description above it can be seen that, because neither the 8-volt blanking pulse nor the 12-volt positive-going differentiated sync pulse is alone sufficient to overcome the bias applied to the cathode of the gating diode D2, both must be present in order for the burst gate to be opened. As a result, the maximum length of time the burst gate can be open will be seen from FIG. 2 to be approximately 4.5 μS, that is from the trailing edge of the horizontal sync pulse, approximately 6.0 μS after the start of the blanking period, to the end of the blanking period. The exact length of time that the burst gate will be open can be controlled by varying the R1-C1 time constant or by varying the bias applied to the gating diode. Clearly either increasing the time constant or reducing the bias voltage will lengthen the period that its burst gate will be open. Such adjustments can be made in specific receivers to accommodate variations in the amplitudes of either the horizontal sync or blanking pulses or in their timing relationship. Furthermore, although the circuit as described above is addressed to a system that is characterized a negative-going sync pulse and a positive-going blanking pulse, it is clear that this invention contemplates operation with pulses of the opposite polarities. To wit, given negative-going blanking pulses and positive-going sync pulses, it would be obvious to clamp the positive-going leading edge of the sync pulse and add (subtract) the negative-going trailing edge to the negative-going blanking pulse. The resultant pulses would then correspond to amplitudes below a predetermined bias level. In any such configuration, the subject invention prevents the burst gate from being opened by noise pulses occurring during the active line period (that is, period between horizontal blanking pulses) and establishes a burst gating phase accuracy independent of the phasing of the horizontal flyback pulses, which are to some extent dependent on the adjustment of the horizontal oscillator operating frequency.

In addition, it is evident from the description above that during periods of time when there is no signal at the input of the television receiver there will be no horizontal sync or horizontal blanking pulses at the input of the differentiating circuit and consequently no gating pulses applied to the input of the burst gate. Although not normally a problem, the absence of gating pulses can be troublesome when the burst gate is used in conjunction with chrominance Automatic Frequency and Phase Control circuitry that requires a period output from the burst gate at all times, concluding those when no signal is present at the receivers input. If an output from the burst gate is not provided, the chrominance subcarrier oscillator may operate randomly and, in particular, hop to a frequency far removed from its nominal value of 3.58 mHz. Although subsequent reception of a signal at receiver's input can be expected to bring the oscillator back on frequency, the pull-in time will increase in proportion to the degree of deviation in the oscillator's operating frequency. Such delays will presumably be encountered every time the receivers channels is changed. This difficulty can be circumvented in the simple and straightforward manner illustrated in FIG. 3, i.e. by coupling an approximately valued resistor, R5, between the junction of R2 and R3 and a source of horizontal flyback pulses. The exact value of R5 is determined by the amplitude of the flyback pulses, the values R3, C2, and R4, the input impedance of the burst gate, and the level of signal required to open the burst gate. As shown in FIG. 3, this results in a predetermined amplitude of horizontal flyback pulse (as shown in the waveform included in FIG. 3) appearing at the input of the burst gate, even in the absence of horizontal sync and horizontal blanking pulse at the input of the differentiating circuit. Because the burst gating pulse "sets on top of" the horizontal flyback pulse, there is no effect on circuit operation during quiescent operation as described above.

Accordingly, while there has been shown and described what are at present considered the preferred embodiments of the invention, it will be obvious to those skilled in the art that various changes and modifications may be made therein without departing from the scope of the invention as defined by the appended claims.

I claim:

1. A burst gating signal generating circuit comprising:
   first means having a first input coupled to a source of horizontal sync pulses and a second input coupled to a source of horizontal blanking pulses, said means for providing at its output differentiated sync pulses;
   clamping means coupled between the source of blanking pulses and the output of the first means for providing combined pulses including differentiated sync pulses clamped and added to the horizontal blanking pulses;
   a bias supply;
   gating means coupled between the output of the first means and the bias supply for providing resultant pulses corresponding to those portions of the combined pulses having an amplitude greater than a predetermined amplitude related to the value of the bias supply, and
   second means coupled between the gating means and the burst gate circuit for removing the DC component of the resultant pulses.

2. A circuit as defined in claim 1 further comprising third means coupled to the burst gate for opening the burst gate in the absence of horizontal sync or horizontal blanking pulses.

3. A circuit as defined in claim 1 or claim 2 wherein the first means is a differentiating circuit comprising a series-connected resistor and capacitor coupled between the source of horizontal sync pulses and the source of horizontal blanking pulses.

4. A circuit as defined in claim 1 or claim 2 wherein the clamping means comprises a clamping diode.

5. A circuit as defined in claim 1 or claim 2 wherein the gating means comprises a gating diode.

6. A circuit as defined in claim 1 or claim 2 wherein the second means comprises a series-connected resistor and capacitor.

7. A circuit as defined in claim 2 wherein the third means comprises an impedance coupled between the second means and a source of horizontal flyback pulses.

8. A circuit as defined in claim 7 wherein the impedance is a resistance.

9. A circuit as defined in claim 3 wherein the clamping means comprises a clamping diode connected in parallel with the resistor of the differentiating circuit.

10. A circuit as defined in claim 9 wherein the gating means comprises a gating diode having an anode connected to the cathode of the clamping diode.

11. A circuit as defined in claim 10 wherein the cathode of the gating diode is coupled through a resistor to the bias supply.

12. A burst gating signal generating circuit comprising:
   a differentiating circuit having an output, a first input coupled to a source of horizontal sync pulses and a second input coupled to a source of horizontal blanking pulses;
   a clamping circuit coupled between the source of horizontal blanking pulses and the output of the differentiating circuit so that combined pulses appear at the output of the differentiating circuit, said combined pulses including differentiated sync pulses clamped and added to the horizontal blanking pulses;
   a gating circuit coupled to the output of the differentiating circuit for passing only those portions of the combined pulses of an amplitude greater than a predetermined amplitude; and
   means for coupling the output of the gating circuit to the burst gate circuit.

13. A burst gating signal generating circuit as defined in claim 12 wherein the gating circuit comprises a diode having one end coupled to the output of the differentiating circuit and another end coupled through a resistor to a bias voltage.

14. A burst gating signal generating circuit as defined in either claim 12 or claim 13 wherein the clamping circuit comprises a diode having one end coupled to the source of horizontal blanking pulses and another end coupled to the output of the differentiating circuit.

15. A burst gating signal generating circuit as defined in claim 12 further comprising means coupled to the burst gate for opening the burst gate in the absence of horizontal sync or horizontal blanking pulses.

16. A method of generating a burst gating signal comprising the steps of:
   (a) differentiating horizontal sync pulses;
   (b) clamping differentiated horizontal sync pulses of one polarity to the horizontal blanking pulses;
   (c) adding differentiated horizontal sync pulses of the opposite polarity to the horizontal blanking pulses;
   (d) gating only those portions of the clamped and added horizontal sync and blanking pulses in excess of a predetermined value;
   (e) coupling the gated pulses to the burst gate circuit.

* * * * *